United States Patent [19]
Knoll et al.

[11] Patent Number: 5,422,812
[45] Date of Patent: Jun. 6, 1995

[54] ENROUTE VEHICLE GUIDANCE SYSTEM WITH HEADS UP DISPLAY

[75] Inventors: Peter Knoll, Ettlingen; Winfried Koenig, Pfinztal-Berghausen; Reinhard Helldoerfer, Igelsdorf; Ulrich Kanzler, Stein; Juergen Leinberger, Nuernberg; Wilfried Urbanski, Berlin; Ruediger Mock-Hecker, Neu-Ulm; Edmund Zaeuner, Berching-Pollanten, all of Germany

[73] Assignee: Robert Bosch GmbH, Stuttgart, Germany

[21] Appl. No.: 810,866

[22] Filed: Dec. 20, 1991

Related U.S. Application Data

[63] Continuation-in-part of Ser. No. 452,677, Dec. 18, 1989, abandoned, which is a continuation-in-part of Ser. No. 274,654, Nov. 21, 1988, Pat. No. 4,888,699, which is a continuation of Ser. No. 22,807, Jan. 13, 1987, abandoned, which is a continuation-in-part of Ser. No. 646,758, Jan. 2, 1991, abandoned.

[30] Foreign Application Priority Data

Jul. 1, 1988 [DE] Germany ............ 38 22 222.1
Feb. 2, 1989 [DE] Germany ............ 39 05 493.4

[51] Int. Cl.$^6$ ................................ G06F 165/00
[52] U.S. Cl. ................... 364/449; 364/444; 340/990; 340/995; 345/8
[58] Field of Search ............ 364/443, 444, 449; 340/438, 988, 990, 995; 345/8, 9

[56] References Cited

U.S. PATENT DOCUMENTS

| | | | |
|---|---|---|---|
| 4,661,811 | 4/1987 | Gray | 340/744 |
| 4,677,450 | 6/1987 | Ito | 364/449 |
| 4,677,561 | 6/1987 | Akama | 364/449 |
| 4,677,562 | 6/1987 | Uota | 364/449 |
| 4,677,563 | 6/1987 | Itoh | 364/449 |
| 4,679,147 | 7/1987 | Tsuji | 364/449 |
| 4,750,014 | 6/1988 | Frank | 345/9 |
| 4,774,672 | 9/1988 | Tsunoda | 364/449 |
| 4,796,189 | 1/1989 | Nakayama et al. | 364/444 |
| 4,806,904 | 2/1989 | Watanuki | 340/438 |
| 4,812,845 | 3/1989 | Yamada et al. | 364/449 |
| 4,907,159 | 3/1990 | Mauge | 364/436 |
| 4,937,753 | 6/1990 | Yamada | 364/449 |
| 4,951,211 | 8/1990 | De Villeroche | 364/444 |
| 4,954,959 | 9/1990 | Moroto et al. | 340/995 |
| 4,963,865 | 10/1990 | Ichikawa | 340/995 |
| 4,988,976 | 1/1991 | Lu | 345/8 |
| 5,067,082 | 11/1991 | Nimura et al. | 364/444 |
| 5,200,844 | 4/1993 | Suvada | 345/9 |
| 5,204,666 | 4/1993 | Aoki et al. | 345/9 |
| 5,229,754 | 7/1993 | Aoki et al. | 345/9 |
| 5,229,755 | 7/1993 | Aoki | 345/8 |

*Primary Examiner*—Gary Chin
*Attorney, Agent, or Firm*—Frishauf, Holtz, Goodman & Woodward

[57] ABSTRACT

A positioning and navigation system for land vehicles features a simple and memory-conserving route entry method. Routes on maps can be specified by the junctions traversed by the route, so that entering only the junctions in memory uses much less space than prior art digital route storage systems which stored the coordinates of each point along the route. A trip progress information display shows the route vividly by using color or brightness contrast with the rest of the map. Additional direction of travel indications can be given, for example on a Head Up Display reflected off the inside of the windshield within the operator's field of view or by acoustic signals or speech-synthesized announcements. This results in particularly easy-to-follow guide to the driver or operator. Head-up displays on motor vehicles often have double images and interfering reflections on the windshield. To avoid these, arrangements of linear polarization filters or shutter foils are suggested, which have particularly high light transmission. Arrangements of filter plates on a combiner inside of the windshield are also advantageous.

8 Claims, 5 Drawing Sheets

ENROUTE VEHICLE GUIDANCE SYSTEM WITH HEADS UP DISPLAY

This application is a Continuation-in-Part of U.S. Ser. No. 07/452,677, filed Dec. 18, 1989, now abandoned, which is a Continuation-in-Part of Ser. No. 07/274,654, filed Nov. 21, 1988, now U.S. Pat. No. 4,888,699, which, in turn, is a Continuation of Ser. No. 07/022,807, filed Jan. 13, 1987, now abandoned, which is a Continuation-in-Part of U.S. Ser. No. 07/646,758, now abandoned.

REFERENCE TO RELATED LITERATURE

DE-OS 38 22 222, KNOLL et al., corresponding to U.S. Ser. No. 07/646,758. DE-OS 38 06 842, KNOLL, filed Mar. 3, 1988 and pub. Sep. 14, 1989. DE-OS 38 06 843, KNOLL, filed Mar. 3, 1988 and U.S. Pat. No. 4,955,698. DE-OS 39 04 344, TEMPELHOF, filed Feb. 14, 1989, to which U.S. Ser. No. 07/468,703, filed Jan. 23, 1990, now U.S. Pat. No. 5,101,537.

FIELD OF THE INVENTION

The invention relates to a navigation system, and more particularly to a navigation system, for vehicles, which is based on a road map.

BACKGROUND

Various types of locating and navigation systems for vehicles are known. Road maps, for example city maps, are stored on compact discs. The instantaneous position of a vehicle is indicated on a monitor, by coupling the information in the compact disc to a vehicle position in computer apparatus. Storing detailed street maps of cities requires a large memory capacity. To record or input a particular travel route of a vehicle on a street map displayed on a monitor requires substantial circuitry and equipment, since the travel route of the vehicle must be entered point-by-point.

German Patent Disclosure Document DE-OS 38 06 842, KNOLL, describes an arrangement to simplify the inputting of information by carrying out input of a travel route with help of a digitized table. A street map of a city is placed beneath a transparent digitized pad, and the desired route is then scanned by a digitizing wand which transfers the desired route point-by-point to a data memory. A system of this kind requires high memory capacity which, particularly on longer trips, may rise rapidly. The stored quantity of data also requires excessive calculating time upon switching from a section of a street map, for example, to another part of the city and to another street map, or due to change of the scale of the map.

The output derived from the navigation system for vehicle travel information could be the straight line or air line distance, and direction to the target point, or the position of the vehicle on the route, and its direction of movement. The output, however, does not provide a street map in which the route is clearly shown and readily recognized, and which facilitates orientation in the city for the operator.

THE INVENTION

It is an object to provide an arrangement in which a detailed street map of the city or of the area through which the vehicle is to travel need not be entered, so that the memory capacity can be substantially reduced.

Briefly, nodal points or junctions used in the travel, that is, used enroute, can be entered with the known digitizing table or panel or pad. By entering a limited number of nodal points, nodes or junctions, input of the desired route is advantageously and substantially simplified. It is sufficient, for the input, to enter a selection of junctions which are closest to the desired travel route. The location and navigation system, by connecting the nodal points, can recognize the desired travel route and indicate it to the vehicle operator. By combining the travel route with a street map displayed on a monitor, the instantaneous position of the vehicle on the map can be indicated. By additional representation of abstracted direction symbols, the driver can prepare himself in time for the next turning maneuver to be executed. Thus, it gives the driver advance information, for example, to place himself in an appropriate travel lane for turning.

In accordance with a preferred feature of the invention, a graphic input pad is used as the input device. A cursor or a digitizing wand can easily select the desired junctions or nodes of the route. Additionally, it is desirable to provide an arrangement to select the appropriate scale, so that the positioning and navigation system can appropriately evaluate the entered data of the travel route with respect to scale. Complex calculation of the scale and errors which may occur during such calculation upon input of data to the travel route are thus avoided. Preferably, predetermined nodes are characterized with alphanumeric symbols for better orientation. The nodes can be characterized, for example, with symbols such as "Railroad", "Bridge", "Post Office:, "Church", or the like, to provide a better overview and assist in orientation of the vehicle operator with respect to her/his environment.

In accordance with a particularly preferred feature of the invention, the travel route, defined by the nodes, is displayed for supervision or monitoring or is provided in the form of an output. Erroneous inputs can thus immediately be corrected and transmitted to the location and navigation system.

It is particularly advantageous that, upon entering the travel route, the stored nodes have to be determined only approximately. The location and navigation system connects the travel route with the next or closest nodes, which substantially facilitates input of the travel route.

To determine and display a street map, only relatively few data must be stored for any one node. It is, then, of advantage to utilize inexpensively made chip cards as data storage elements or memories. For example, respective city maps can be represented on chip cards; by exchange of a chip card, the location and navigation system can easily be loaded with a new street map.

In accordance with another advantageous feature of the invention, route information output is provided by a monitor, on which the travel route, shown in the street map, is clearly visible, for example in contrast, e.g. by change in color or brightness. The output of additional symbols, which may be abstract representations of travel paths provides the operator of the vehicle with simple and easily reviewed directions for vehicle operation. Landmark and path direction symbols may, further, be supported or stressed by spoken directions. Simple representation of path direction and landmarks permits rapid perception, of changes in the direction of driving, by the operator. Thus, the operator is hardly distracted from providing attention to traffic. Selective representation of a city street map and/or landmark symbols facilitates finding the destination.

DRAWINGS

DETAILED DESCRIPTION OF THE PREFERRED EMBODIMENTS

Figure 1:
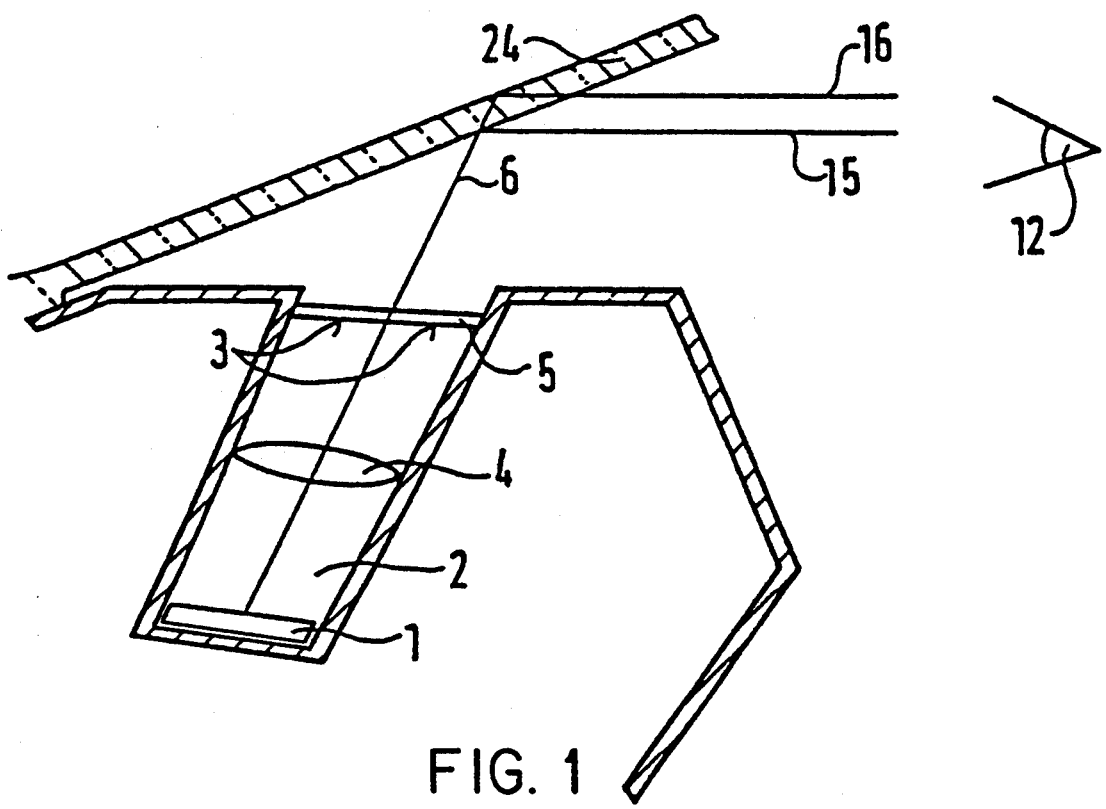
FIG. 1 illustrates reflecting beams of virtual images on an untreated windshield.
Figure 2:
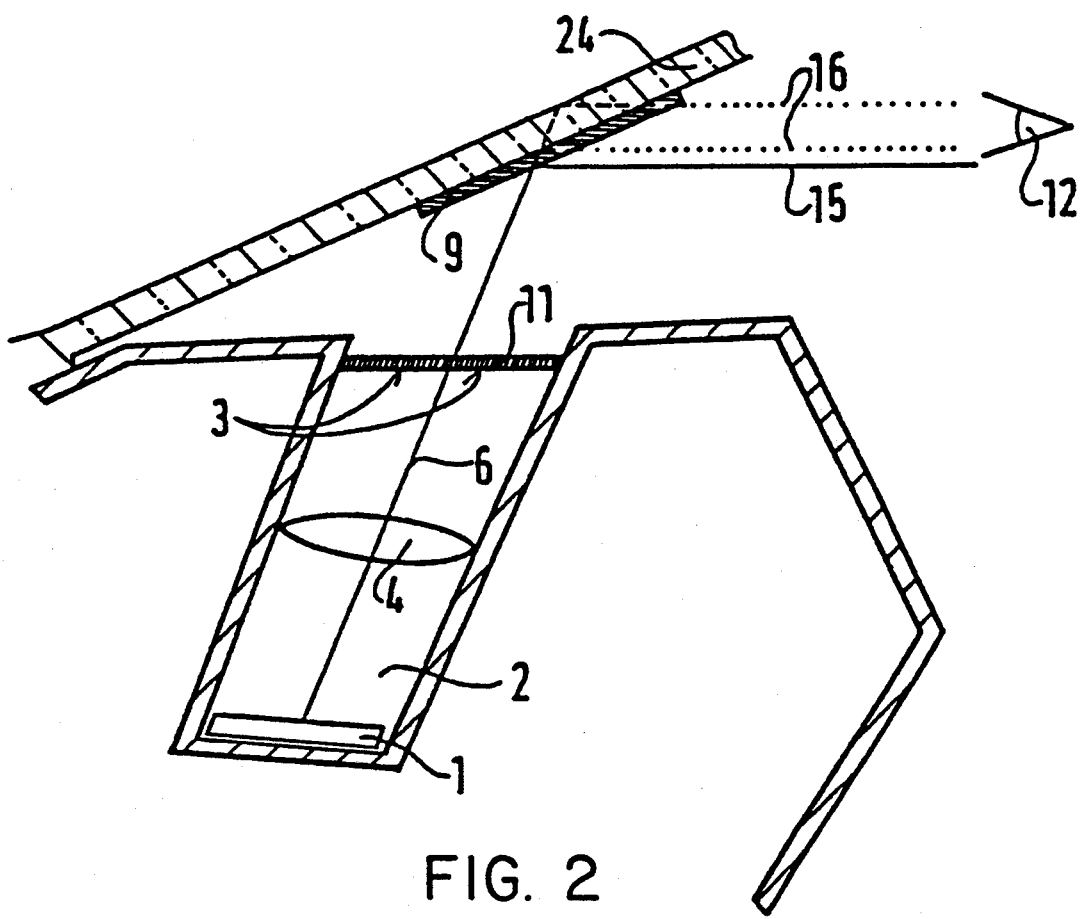
FIG. 2 illustrates a first exemplary embodiment of the Head Up Display (HUD) of the present invention.

FIG. 1 shows a known optical device in which luminous flux 6 is generated by display elements 1 and focused by an optical device 4. It impinges on the windshield 24, where it is reflected on the inside as well as the outside of the plate. Various display elements are suitable, such as those in our earlier German DE-OS 38 06 843 and corresponding U.S. Pat. No. 4,955,698. Because of the thickness of the plate, an observer seated in about the position 12 sees two offset, approximately equally bright virtual images on the plate 10, which are superimposed on the view of the road. Since scattered light from the outside may also enter the observed space, clear reading of the display is made very difficult for the observer. To avoid these disruptive effects, a first polarization filter 11 was inserted into the outlet opening 3 in the exemplary embodiment in accordance with FIG. 2, which linearly polarizes the luminous flux 6. Furthermore, a second polarization filter 9 has been applied to the inside of the windshield 24. Its direction of polarization extends perpendicular to that of the first polarization filter 11. A portion of the luminous flux 6 is now deflected towards the driver by the side of the second polarization filter 9 facing the driver; he sees the virtual image of the display elements 1. The portion of the luminous flux 6 not reflected on the surface of the second polarization filter 9 is absorbed to a large part in the crossed second polarization filter 9. The reduced image is identified by the dotted line 16, while the primary image is indicated by the luminous flux 15. By moving the optical device 4 in the well 2, the image distance (virtual distance) of the display elements 1 can be set. By means of this, the driver is capable of adapting the display image to the viewing conditions on the road. A brightness adjustment, not shown, is also provided, which permits manual or automatic adjustment of the brightness of the display to prevent dazzling, in particular during darkness. Preferably the second polarization filter 9 is disposed in the lower portion of the windshield which essentially is located in the vision field towards the hood. Detracting interferences with the view of the road are avoided by this.

Figure 3:
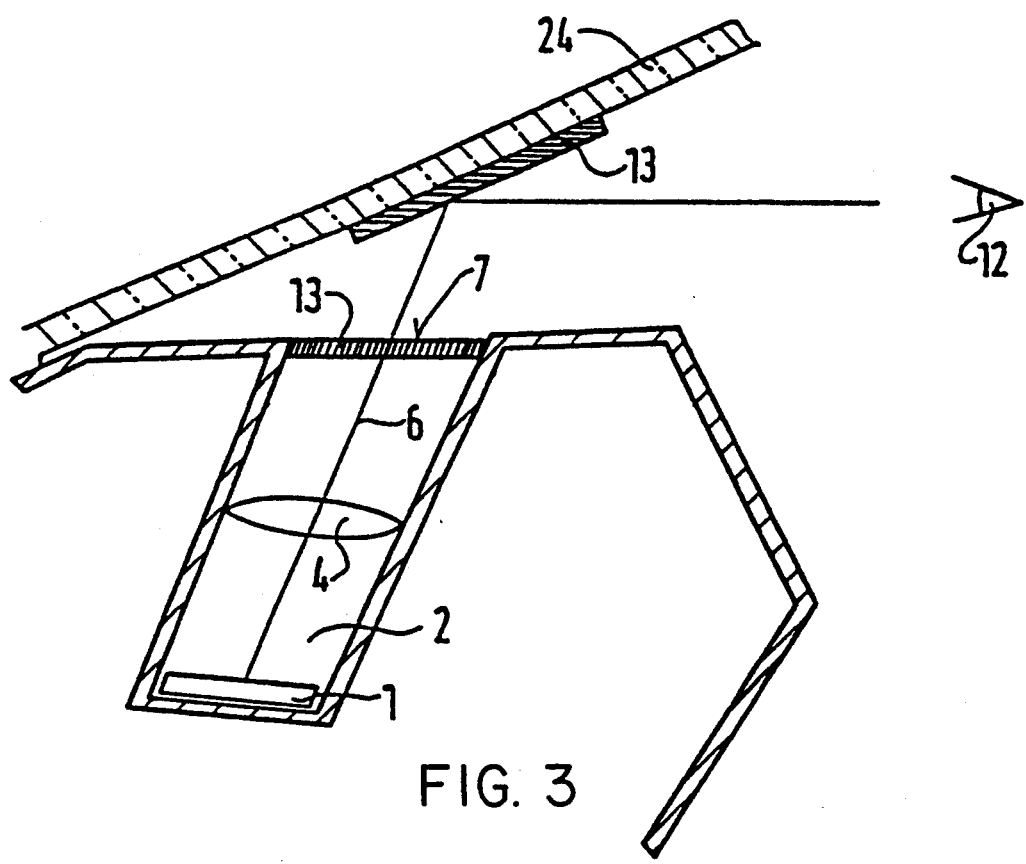
FIG. 3 illustrates a second exemplary embodiment thereof.
Figure 5:
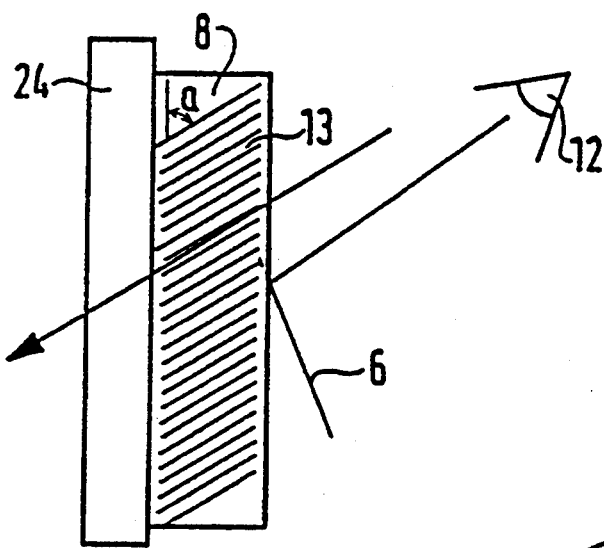
FIG. 5 shows the operation of the shutter.

A second exemplary embodiment is shown in FIG. 3. Shutters 7, 8 have been employed in this case, instead of the polarization filters. The shutters 7, 8 have parallel disposed reflectors which let the impinging light through or stop it, depending on the angle of incidence. The shutter 8, fixed on the inside of the windshield 24, is aligned in such a way that the impinging luminous flux 6 is partially deflected on its surface towards the driver. The function of this reflector plate is illustrated in FIG. 5. The reflectors 13 are disposed such that the remaining portion of the luminous flux 6 is completely absorbed and no double image is therefore generated. Thus only the reflection generated on the plane of separation between the air and the foil is utilized. On the other hand, the view of the observer 12 through the shutter 8 is only slightly hampered, because the shutter 8 has a high degree of transmission at this viewing angle. A second shutter 7 is disposed in the outlet of the light well 2 to avoid unwanted reflections from the optical space of the HUD. Here the reflectors are disposed parallel to the luminous flux 6, so that the luminous flux 6 can pass through practically unhindered. With suitable inclination of the windshield 24 with the first shutter 8 it is possible to refrain from using the second shutter 7, because the interfering reflections based on light falling into the optical space cannot occur. The shutters can also be embedded in an intermediate layer of the windshield 24 to prevent scratching of the foils.

Figure 4:
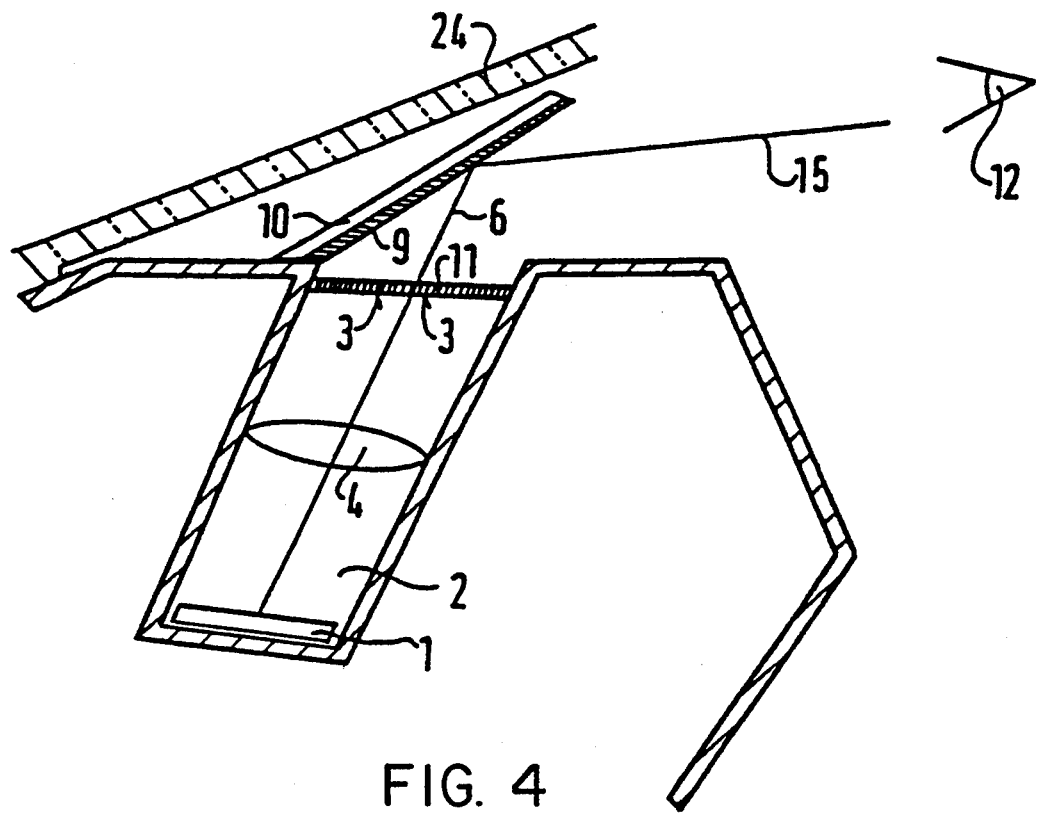
FIG. 4 shows a third exemplary embodiment.

A third exemplary embodiment of the invention is shown in FIG. 4. In this case a transparent plate in the form of a combiner 10 has been provided inside of the windshield 24 at the outlet 3 of the well. Either the second polarization filter 9 of the first exemplary embodiment or the shutter 8 is disposed on the side of the combiner 10 facing the driver. The well cover 11 with a polarization filter or a shutter follows accordingly. The functioning of this exemplary embodiment is the same as in the ones previously mentioned. However, in a further embodiment of the invention the combiner was disposed pivotable, so that the position of the virtual image on the combiner 10 can be individually selected independent of the inclination angle of the windshield 24. When the combiner 10 has been set at the Brewster angle in respect to the luminous flux 6, it receives maximum light intensity. The position of the windshield and the aerodynamic effects on the chassis connected therewith need to be considered when a combiner is provided. Further explanation is not necessary, because the functioning is the same as in the first exemplary embodiment.

Figure 6:
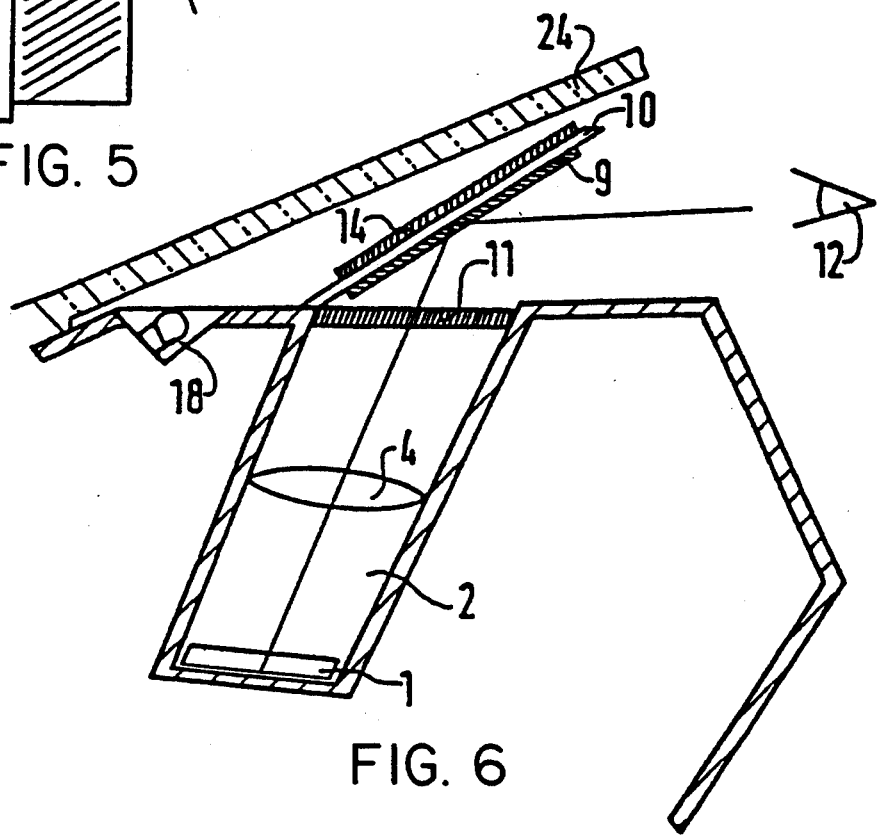
FIG. 6 shows a combined display with two liquid crystal displays (LCD)
Figure 7:
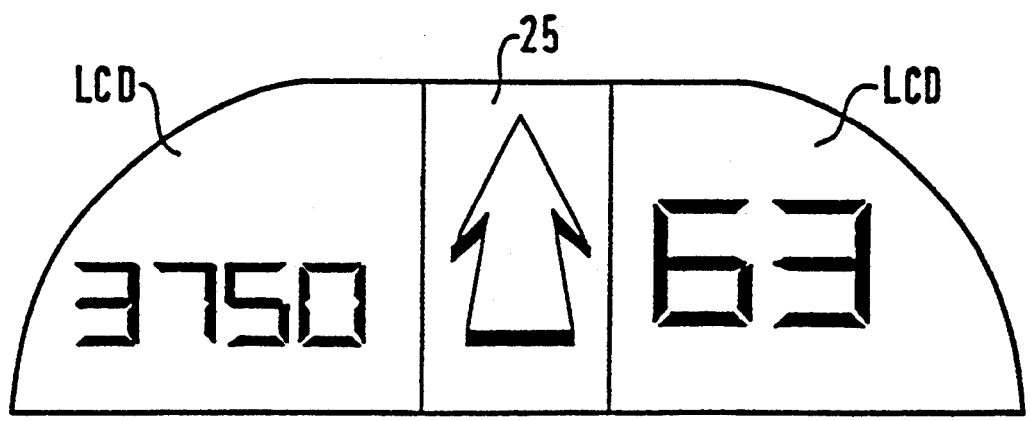
FIG. 7 shows the structure of the combined display in section.

A further exemplary embodiment is shown in FIGS. 6 and 7, having a combination of a field with a virtual image and two laterally disposed liquid crystal displays LCD on a common combiner 10. As in the third exemplary embodiment in accordance with FIG. 4, the field with the virtual image is supplied with the second polarization filter 9 on the side (front) of the combiner 10 facing the observer 12. Usefully the second polarization filter 9 is laid over the entire front of the combiner 10. Transparent liquid crystal displays LCD, for example to indicate the engine rpm and vehicle speed, are preferably provided between the second polarization filter 9 and the combiner 10 laterally next to the field with the virtual image. It is, of course, also possible to integrate other indications such as oil pressure, time or traffic information. The liquid crystal displays LCD preferably have dark or colored symbols. The required electrical supply lines are disposed on the liquid crystal displays at a non-interfering place.

On the side facing the windshield, the liquid crystal displays LCD are backed with a third polarization filter 14 to assure the operation of the liquid crystal displays. To absorb interfering light reflections to the greatest possible extent, the polarization direction of the second polarization filter 9 is preferably aligned approximately vertically. It is also provided to equip the liquid crystal displays LCD with a controllable lighting device 18 which may be disposed, for example, in the space between the windshield 24 and the combiner 10.

Functioning of this arrangement is as follows. For example, the field with the virtual image displays traffic information for the driver, as already described in accordance with the first exemplary embodiment.

In this case, two additional electrically operated liquid crystal displays LCD are provided which indicate, for example, rpm and speed. However, other displays can also be provided, particularly if the liquid crystal displays LCD are provided with a memory. For example, with appropriate design of the liquid crystal displays LCD, road maps or city maps could be displayed.

Figure 10:
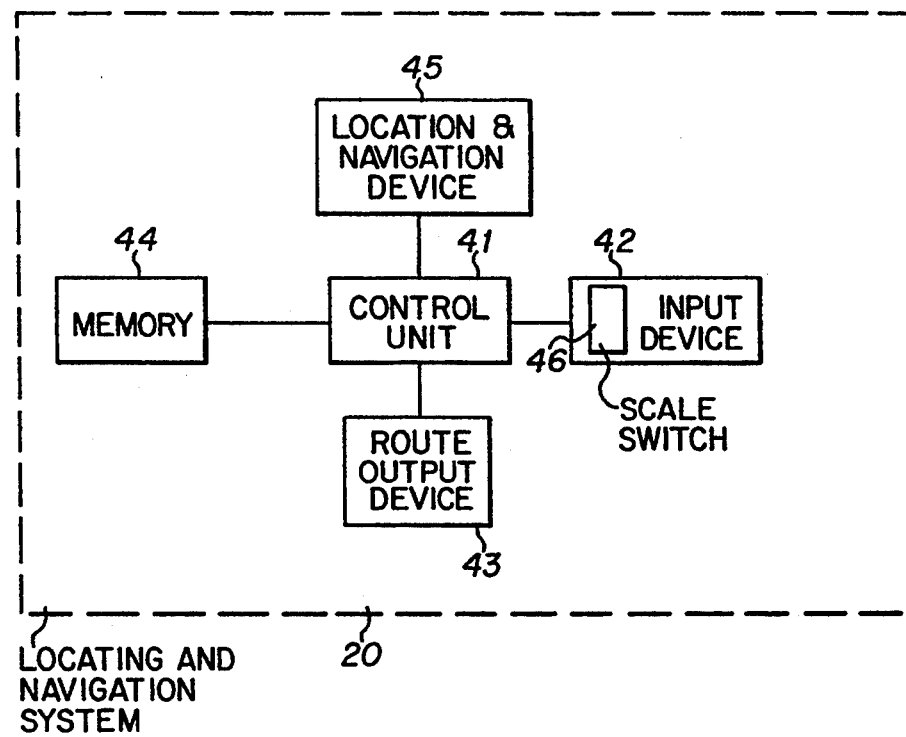
FIG. 10 is a block circuit diagram of a location and navigation system.

The location and navigation system 20 (FIG. 10) is a composite of a plurality of system groups. The location and navigation device 45 is coupled to a control unit 41 which controls the data exchange with an input device, the memory 44 and the route output device 43. The respective elements or units or devices of the navigation system 20 are known as such, so that a detailed description is not necessary. For example, the input device 42 can be a graphic input pad or digitizing panel, as described, for example, in German Patent Disclosure Document DE-OS 38 06 842, KNOLL. The input device 42 includes a scale switch 46 which normalizes the street or road map as well as the travel route to a common scale, for example the scale at which the location and navigation device 45 is operating. The location and navigation device 45 includes all the components which are necessary to measure the path and direction of the vehicle, as well as all devices necessary for data processing.

Memory 44, besides the data stored for street, road or city maps, also stores path or landmark symbols in abstract form. The memory 44 can be coupled to a further data input device, for example a credit card reader. The route output device 43 which, for example, may include a monitor, displays all the data and provides an output of the required data. These data can be represented in the form of graphics, for example a street map with a travel route indicated thereon, or abstracted path guidance symbols. The system 20 may be attached to or connected to additional devices. For example, the memory 44 which, of course, is a database storage device, may be coupled to a further data input unit, such as a compact disc (CD) player; the input device 42 can be coupled to an alphanumeric keyboard. The route output device 43 can display not only travel information but further information as well, derived from other data sources.

Figure 9:
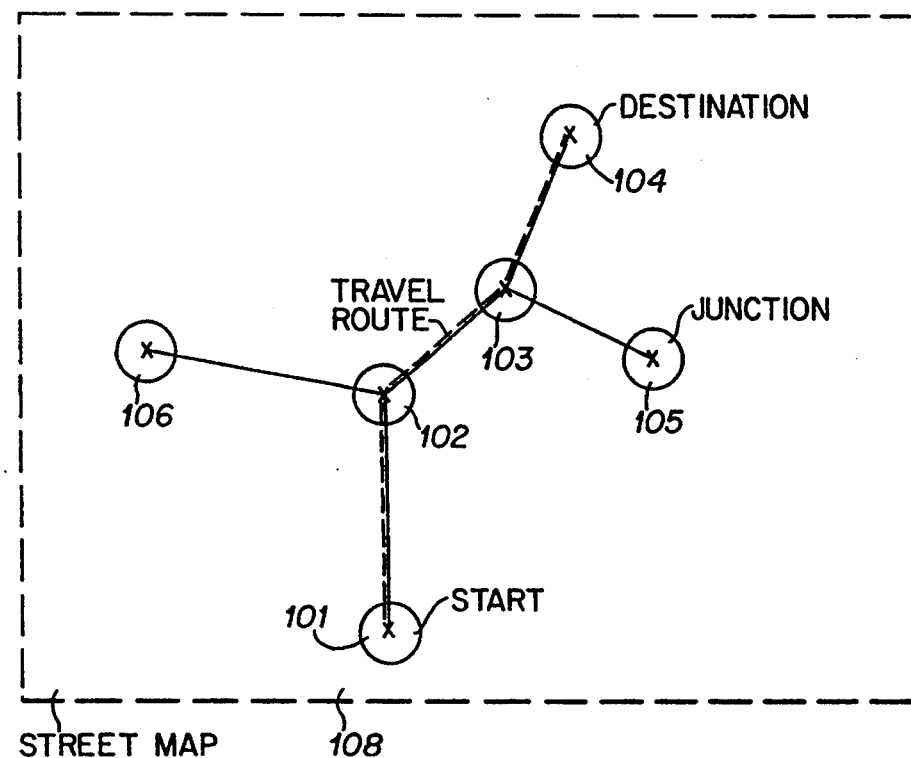
FIG. 9 is a fragmentary representation of a street map.

Operation, with reference to FIG. 9:

The street map 8 of FIG. 9 is highly simplified. It shows nodes or junctions 101-106, all connected by straight lines. The nodes or junctions may, when placed at actual streets or roads, characterize intersections of the streets or roads or they may characterize landmarks, such as readily recognized buildings or other particular and readily recognized structures. The distance between the junctions with respect to each other is determined by the actual streets. It is desirable to place a new nodal point or junction when the course or direction of the street changes markedly, or at a street crossing or intersection. The straight lines connecting the junctions, symbolically, also represent segments of streets which show the course of the actual streets, at least in general form.

Let it be assumed that a travel route is entered in the street map 108, which starts at the junction 101 and has the junction 104 as its goal or target. This route, shown in broken lines 107, will lead via junctions 102 and 103. To enter the route, it would then be sufficient to enter the junctions 101, 102, 103, 104. In this specific example, in which only the single possibility of travel is available, it would even be sufficient to only enter the junctions 101 and 104. In a complex street network, however, it is usually so that a plurality of routes are available and, thus, it is desirable to select one of the various possible routes by entering the nodes or junctions. Small circles are drawn about the junctions 101-106. These junctions indicate the catchment region 91 of the route. To simplify the input of the nodal points or junctions, it is desirable to place the selected route 107 only in the vicinity of the predetermined junctions, namely within the catchment region or zone 91.

The travel route, in actual practice, of course must follow existing streets or roads. It is thus readily possible that the locating and navigation system will associate the actual route with the actual street map. If, after entering the travel route, changes or corrections are necessary or desirable, a portion or the entire travel route can be erased, for example by an erasing key, which can be placed on the graphic input pad, which permits whole or partial erasure and/or correction.

Figure 8:
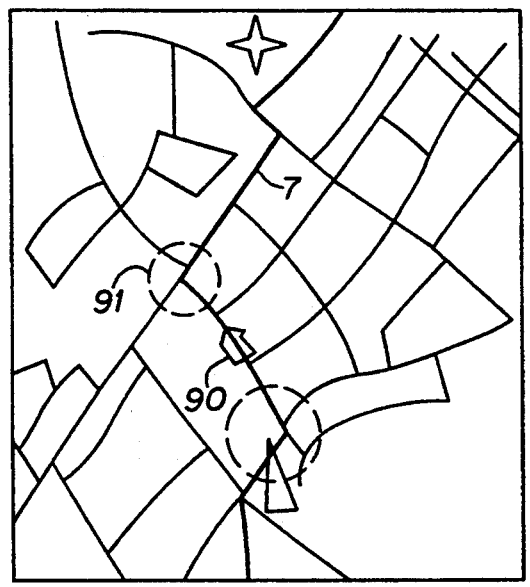
FIG. 8 is a fragmentary representation of a street map with a route indicated thereon.

To supervise recognition by the locating and navigation system 20 of the desired travel route 107 between the starting point 101 and the destination 104, a portion of the street map, as well as the route 107 indicated thereon is represented on the travel information output device 43, as illustrated in part in FIG. 8. The desired travel route along the stored street map is entered therein. If too few junctions were provided to characterize the travel route, the locating and navigation system will select the shortest street connection from start to destination. The instantaneous position of the vehicle is coupled in to the locating and navigation system, based on the street map; thus, it can be indicated symbolically directed on the predetermined travel route.

Figure 11:
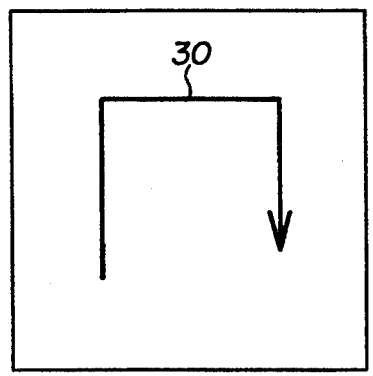
FIGS. 11-13 illustrate path directing symbols.
Figure 12:
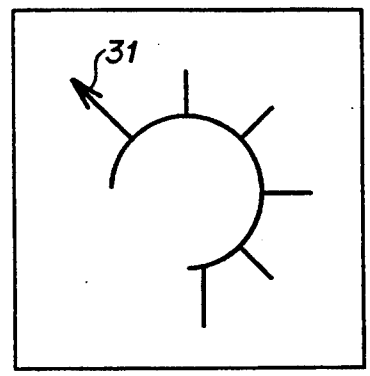
Figure 13:
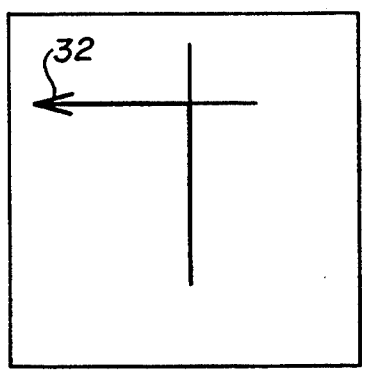

When, in the course of travel, the operator of the vehicle approaches intersections and turn-off points, where a decision has to be made which way to go, guiding symbols 30, 31, 32 (FIGS. 11, 12, 13) can be displayed on the output device 43 in abstract form, or can be displayed on an additional display device. Such abstracted path guiding symbols are shown in exemplary form in FIGS. 11-13. They are visually similar to direction information on road signs, and are thus familiar to vehicle operators. By the partial or abstracted representation, which can be displayed in good time before a decision must be made, the operator can be forewarned to make a decision for the further course of the travel path. It enables the operator to place the vehicle in a turning lane, for example, since the further course of the travel route is indicated. The respective symbols shown in FIGS. 11-13 are so simple that the operator is distracted as little as possible from attention to overall traffic; various possibilities of representing such abstracted path guiding symbols 30-32, which can be rapidly recognized, can be shown. The operator may be furnished with a switch located, for example, in the region of the steering wheel which changes over the information display device from the representation of the street map to the path guiding symbols, so that the guiding symbols 30-32 will then be displayed. The representation of the path guiding symbols 30-32 is most simple and effective if displayed on a "Head Up Display" (HUD) within the field of vision of the operator. Head Up Displays are particularly suitable to represent simple symbols and may be displayed, for example, on the windshield within the field of vision of the driver, by optical displays. Head Up Displays are known and described, for example, in German Patent Disclosure Document DE-OS 38 22 222, filed Jul. 1, 1988, and corresponding PCT/DE 89/00348, filed May 31, 1989, whose U.S. national phase is U.S. Ser. No. 646,758, filed Jan. 2, 1991, pertinent portions of which follow:

There are many suggestions for displaying relevant data to the driver of a motor vehicle by means of a so-called head-up display (HUD). In connection with this, measured data and warning signals of importance for the driver are reflected onto a portion of the windshield which lies within the field of vision of the driver. Their purpose is to enable the driver to recognize indicators, such as speed, safe brake operation or traffic information, even if his attention is directed to the traffic situation and without having to remove his eyes from the road. The need for adjustment of the eyes of the driver is eliminated to a large extent.

Head-up displays require a partially transparent mirror for superimposition of the virtual image generated by the data elements on the image of the environment. A reflection on the windshield or on an additional plate (combiner) placed inside of the windshield can be used for this in a motor vehicle. In both cases reflections appear at the planes of separation between the windshield or the combiner plate and the air, which result in undesirable double images and in this way considerably impair the legibility of the data. The entry of light into the optical space of the HUD results in reflections which are also blended into the field of vision of the driver. A bright, fog-like background surface appears for the driver, which hampers the view of the traffic situation. To suppress these effects, coating of the inner boundary surface with a dielectric layer is generally suggested, by means of which one of the reflected images is enhanced and the other attenuated.

It is furthermore known to design the reflecting layers in such a way that they only reflect light of the wavelength given off by the indicator elements disposed within the dashboard. The effect of ambient light can be reduced by this.

It is furthermore known from German Letters Patent DE-PS 33 47 271 WIESMEIER & REINIGER/DAIMLER BENZ AG, issued Aug. 28, 1986, to polarize the luminous flux and to deflect it in the direction of the driver from a multiple coating with different refractive indices applied to the windshield, taking the Brewster angle into consideration. The application of dielectric coatings by vacuum evaporation or sputtering in high vacuum, in particular on the windshield, is very expensive. It is known that these coatings are also very sensitive to scratches and dirt, so that the legibility of the displays is impaired.

In contrast to this, the device in accordance with the invention has the advantage that polarization filters are used, which are simple and inexpensive to manufacture and provide a good contrast of the displays on the windshield. It is also advantageous that they are scratchproof and can be easily replaced in case of possible damage. Advantageously, the transmission of light in the direction of the road is only minimally hampered by the use of shutters.

The use of a second shutter in the luminous flux is particularly advantageous, because interfering scattered light is stopped down to the greatest extent possible. Disposition of the filter plates on a pivotable combiner inside of the windshield is advantageous, if it is intended to make the angle of vision and brightness of the displays variable. The virtual image can also be adjusted for drivers of different height by pivoting the combiner, so that in an advantageous manner maximum contrast is always achieved within the Brewster angle. It is also advantageous to combine preferably transparent liquid crystal displays with the virtual image on the combiner because, by means of this, important vehicle data, which can be displayed very clearly together with traffic information, such as rpm or speed, can be reflected with a high degree of contrast into the field of vision of the driver.

A further advantage is that because of their thin walls the filter foils or plates can be very easily embedded inside the windshield in connection with composite glass without noticeable distracting reflections, because of which they are particularly well protected against mechanical damage. Also, the placement of the displays in the field of vision on the hood is advantageous, because the view of the road is not hampered by this, while adjustment for the eyes is avoided to a large degree. By changing the reflection angle at the combiner or the brightness of the illumination it is furthermore possible to adapt the virtual image of the displays in an advantageous manner to daylight conditions, by means of which, dazzling of the driver is prevented, particularly at night.

Additionally, aural output can be provided so that the operator's attention is directed acoustically, as well as optically, to changes in direction of the path to take.

Simple input of a path route into a navigation system with few junctions or nodal points, as well as the easily scanned output of driving and path information, facilitates reliable and safe travel to a destination.

The road or street map input is preferably used for streets, highways as well as networks of expressways. If the density of streets is high, for example in city street maps, it is desirable to separate the area of the city into a plurality of coordinate surfaces, in segments, for example defined by north-south and east-west direction lines, which subdivide the city map into regions of rectangular outline. By suitable dimensioning of these segments, looked at from an abstract point of view, each street can be represented by a plurality of such segments. A desired travel route can then be determined by a selection of such segments.

In contrast to prior art methods, to provide input of the course of streets and roads in digital form, a substantially lower requirement on memory is necessary by selection of segments. In dependence on the selection of segments, the street path may be represented by sharp corners and a straight line may be represented by closely adjacent sawtooth lines; no larger navigation error, however, will result, since each time a new segment is passed by the vehicle, correction will automatically obtain.

The locating and navigation system has substantially reduced memory requirements, and permits simple input of a travel route, while providing a highly readable route output information.

The present invention, thus, provides a memory or database 44 which coordinates of junctions of roads which form part of a stored map. In accordance with the invention, specific junctions are selected which are stored in the database and a continuous line through the selected junctions is selected by the operator to form the trip route. By connecting only the junctions, memory space in the database is conserved.

The current vehicle position, for example position 100 (FIG. 8) on the selected route can be indicated and especially with respect to the next junction, which, also, can provide a display similar to the display of FIG. 13, but reversed right for left with respect to FIG. 13, to assist the operator in making a decision about turning from an existing direction to a new direction.

We claim:

1. Map-support positioning and navigation system, for a land vehicle, having
    input means (42) for selecting and specifying a trip route (107) by its starting, destination, and certain intermediate points, including any road junctions forming a part thereof;
    database means (44) for storing coordinates of said road junctions forming part of a stored map;
    means (45) for sensing distance travelled by said vehicle and sensing directional orientation of said vehicle;
    control means (41) connected to outputs of said input means (42), said data means (44) and said sensing means (45); and
    means (43), coupled to an output of said control means (41), for communicating trip progress information to a vehicle operator;
    wherein
    said control means (11) is responsive to said input means (12) for selection of said trip route, including any of said road junctions forming a part thereof;
    said communicating means includes
        means for displaying a map (8),
        means for indicating, on said map, a continuous selected route (7) by contrast with other portions of said map; and
        means, coupled to an output of said control means (11), for generating, upon approach to each said road junction located along said selected route, a visual direction-of-travel indication (30–32) on a Head Up Display within said vehicle operator's field of view, which advises said vehicle operator which direction to steer at said junction in order to remain on said selected route;
    said Head Up Display is an optical device for reflecting data in the form of a display generated by
    display elements (1) which emit a luminous flux (6) in a well adjacent a dashboard instrument cover, said display being projected into the field of vision of the driver via an optical device through an outlet opening (3) of the well toward a windshield (24) and then being reflected toward the driver;
    a first polarization filter (11) extends across the outlet opening (3) in the path of the rays of the luminous flux (6); and
    a second polarization filter (9) is provided, which is located adjacent the inside of the windshield (24) and extends with its direction of polarization approximately perpendicular to the first polarization filter (11).

2. System according to claim 1, wherein
    said input means (42) includes means (46) for matching selected starting, destination, and intermediate point coordinates to a scale of said stored map, thereby facilitating identification of said selected trip route.

3. System according to claim 1, wherein
    said input means includes means for specifying said selected road junctions (101–104) by alphanumeric characters.

4. System according to claim 1, further comprising
    output means (43) for continuously indicating said selected road junctions to a user, as said junctions are being selected.

5. System according to claim 1, further comprising
    means for indicating a current vehicle position by indicating which junction on said selected route is to be reached next by the vehicle.

6. System according to claim 1, wherein
    said input means (42) includes means for reading junction selection data from a portable data storage means (44).

7. System according to claim 6, wherein said portable data storage means (44) is a magnetic card.

8. System according to claim 6, wherein said portable data storage means is an optical storage medium.

* * * * *